April 1, 1947.　　　　　E. K. STODOLA　　　　2,418,143
SIGNAL COMPARISON SYSTEM
Filed Dec. 21, 1944
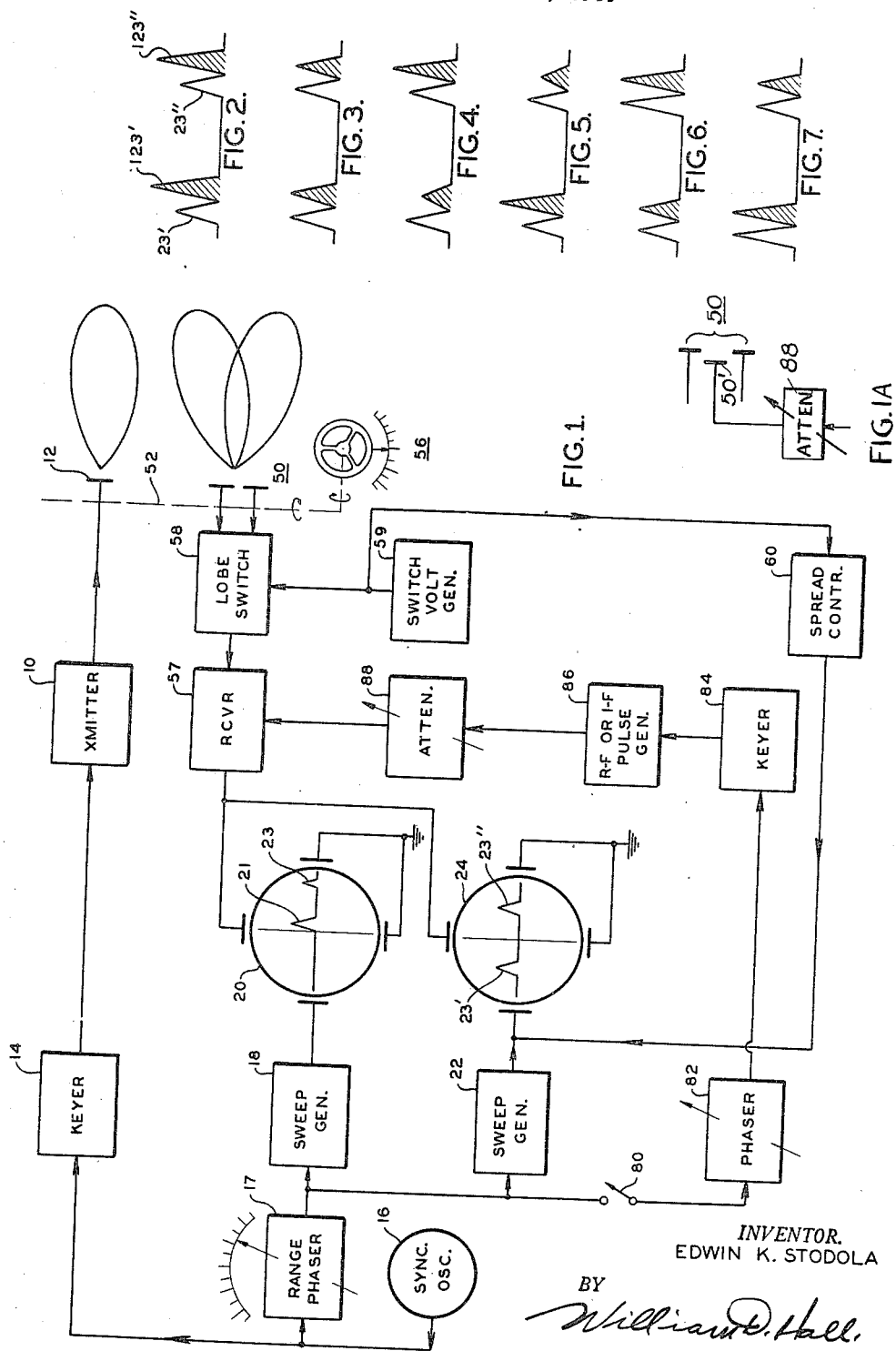
INVENTOR.
EDWIN K. STODOLA
BY
William D. Hall.
ATTORNEY Patented Apr. 1, 1947

2,418,143

UNITED STATES PATENT OFFICE 2,418,143

SIGNAL COMPARISON SYSTEM

Edwin K. Stodola, Neptune, N. J., assignor to the Government of the United States of America, as represented by the Secretary of War Application December 21, 1944, Serial No. 569,246

9 Claims. (Cl. 250—1.72)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an improved means and method for determining the direction of incidence of a wave. More particularly, it relates to expedients for more accurately determining the bearing of an echo-producing object, or "target," by pulse-echo methods in spite of the presence of considerable jamming interference.

Conventional methods of indicating the bearing of an echo-producing target, commonly called "lobe-shifting" or "double-tracking" methods, involve the reception of the echo with an antenna having two diverging, partially-overlapping response lobes or having a continuously moving response lobe, and then comparing the relative amplitudes of the echo-pulses received on said lobes. If said amplitudes are not equal, the antenna is rotated until they become equal, at which point the bearing of the antenna is such that it is accurately "on target." For a more complete disclosure of one such system, reference is made to the copending application of James R. Moore, Serial No. 467,266, filed November 28, 1942.

While the above-described method of bearing determination is perfectly satisfactory when only the desired echo is received at any one instant, it is not reliable when jamming interference which overloads the receiver is received together with said echo, particularly if the interference is of the continuous-wave type. Because of the minute amount of energy reflected by the target, the receiver used must be extremely sensitive and, hence, easily overloaded or even saturated, especially in the later stages thereof. Under conditions of overload, the effective amplification of the receiver varies considerably with the signal strength. Moreover, if a non-linear detector is used, the ratio of output to input varies with signal strength even if no overload condition exists. This makes it extremely difficult, or even impossible, to determine the point at which echoes received on the two lobes are equal in the event that the receiver is unequally affected by the energy in the respective lobes.

It is a principal object of this invention to provide means for accurate bearing indication in a receiver using an antenna which is lobe-shifted, even under the conditions above discussed. For this purpose an artificial R. F. (radio-frequency) pulse, or "sampling" signal, is injected into the receiver ahead of some point which is likely to be overloaded by the jamming signal, preferably at a time which is in the neighborhood of the received echo. By comparing the amplitudes of the two indications of the signal on the two lobes with the amplitudes of the sampling signal indications, equality of the echo signals received from both lobes can be determined even if the echo-signal indications do not appear equal.

For a better understanding of the invention together with other and further objects thereof, reference is had to the following description taken in connection with the accompanying drawing, wherein:

Fig. 1 is a block diagram of the invention; and

Figs. 2–7 are views of the observed signals under different conditions of operation of the invention.

In Fig. 1, there is shown a preferred embodiment of the invention as applied to a typical pulse-echo object-detection system. Said system includes a normally-blocked radio transmitter 10 coupled to a directional dipole array 12. The transmitter is intermittently rendered operative by spaced, positive pulses from a keyer 14 which operates under the control of a sine-wave synchronizing oscillator 16, operating at a frequency generally in the audio region. In a manner well known in the art, keyer 14 generates a sharp positive pulse at every cycle, or plurality of cycles, of the wave from oscillator 16. Each positive pulse will, in turn, unblock transmitter 10, whereby spaced R. F. wave trains, or pulses, are generated and transmitted from antenna 12.

In synchronism with each R. F. pulse, a sweep generator 18, also controlled by synchronizing oscillator 16, generates a saw-tooth wave which is impressed upon the horizontal deflecting plates of a cathode-ray range-indicating oscilloscope 20 to provide a horizontal time base therefor. A sweep generator 22, also under the control of synchronizing oscillator 16, provides a horizontal time-base for a bearing-tracking oscilloscope 24.

Echoes of the transmitted pulses are received on a dual-lobe antenna array 50 mounted on a common support with transmitting antenna 12. A common reflecting screen 52 renders both antennas unidirectional. The antenna support is mounted for rotation so that the antennas can be pointed in any desired direction under the control of a manual or power-operated positioning control element 56 having associated therewith a scale and pointer for indicating the effective direction of the antenna array.

The signals received along the respective lobes of antenna 50 are alternately applied, through a continuously-operating electronic lobe-switch, to a receiver, the output of which is applied to the vertical plates of oscilloscope 20 and 24, so that both the transmitted pulses and received echoes will vertically deflect the trace to form signal-indicating "pips" as shown at 21 and 23 respectively. The range, i. e., the distance to the target, is determined by means of oscilloscope 20 in conjunction with a range-measuring phase shifter 17, as follows: Phase shifter 17 is first adjusted until the transmitted pulse pip 21 is positioned at the center hairline of the oscilloscope, as shown in the drawing. The pointer of phase shifter 17 is then adjusted until it is at the zero point of the scale. The phase shifter 17 is then adjusted until the echo pip 23 is at the hairline. The pointer will then indicate on said scale, which is directly calibrated in distance units, the range of the target.

Lobe switch 58 comprises two amplifiers, each of which is excited by the output of one of the lobes of antenna 50. Said amplifiers are alternately made operative by the positive and negative alternations of a square-wave switching voltage generated by a multivibrator 59, which may operate at a frequency as high as several thousand cycles per second. The switching voltage is also applied to the plates of tracking oscilloscope 24 to collinearly displace the trace so that the signal pips respectively formed by the echo signals in the two lobes will be laterally displaced, as shown at 23' and 23". An amplifier 60, having an adjustable gain, controls the amplitude of the square-wave "spread" voltage and hence the separation between the two pips. If the two pips are equal, as shown, then the antenna is "on target" and the bearing can be read on indicator 56. If the two pips are unequal, then the antenna is rotated in the proper direction to equalize them.

As thus far described the system is conventional. For reasons above pointed out, unequal interfering components received on the two antenna lobes, will cause the echoes received on said lobes to be unequally amplified, so that equal signals at the input of the receiver will appear unequal on the tracking oscilloscope 24. Hence, equality of the two pips 23' and 23" will not represent equal energy in the two lobes and will result in a false bearing indication of the target.

To overcome this difficulty, a means is provided to inject a sampling pulse slightly displaced in time from the reception of the desired echo pulse. For this purpose the output of range phaser 17 or, in some cases, the output of synchronizing oscillator 16, is passed through a switch 80 and a phaser 82, which may be adjustable, to a keyer 84, which periodically pulses a high-frequency sampling-signal oscillator 86 of relatively low power. The output of the oscillator is injected, through an adjustable attenuator 88, into an R. F. or I. F. (intermediate-frequency) circuit of the receiver. The point of injection is such that the amplification of the stages of the receiver preceding said point are not affected by the interference level. If necessary the sampling signal may be injected into both lobe channels of the receiver, or, it may be coupled to an auxiliary dipole in the field of the main antenna. This modification is illustrated in Figure 1A wherein the output of attenuator 88 is applied to an auxiliary dipole 50' symmetrically disposed with respect to the two sections of antenna 50. The frequency of oscillator 86 will, of course, be equal to the frequency of the received echo wave in the circuit in which the sampling signal is injected. The duration of the injected pulse should preferably be equal to that of the main transmitted pulse.

In the operation of the system, switch 80 is opened and range-phaser 17 is operated until echo signal 23 is moved to the hairline of oscilloscope 20. The antenna is then rotated until the two pips 23' and 23" on oscilloscope 24 are of equal height. Switch 80 is then closed and the images on oscilloscope 24 will appear as shown in Figs. 2–7, wherein the shaded pips are indications of the injected sampling pulse, and the unshaded pips are indications of the echo pulse. Phaser 82 should be adjusted so that the sampling pulse pips are as near to the echo pips as possible.

To determine the presence and effects of jamming, switch 80 is closed and the following observations are made:

*a.* If echo signal pip 23' is equal to pip 23", and sampling signal pip 123' is equal to pip 123", as shown in Fig. 2, then there is either no jamming signal present or said jamming signal affects both lobes equally, i. e., both the echo signal and jamming signal arrive along the same directional axis. To facilitate observation, attenuator 88 is adjusted so that all four pips are exactly the same in height, as shown in Fig. 3. This indicates that a true bearing is being obtained.

*b.* If the jamming is not symmetrical with respect to both lobes, then pips 23' and 23" will still be equal but pips 123' and 123" will not be equal, as shown in Fig. 4 or Fig. 5. This will indicate that the equality of the two echo pips was obtained because of unequal amplification of the echoes by the receiver and not because of equal energy received by the two antenna lobes, so that the antenna is not properly oriented toward the target. Fig. 4 indicates an off-target condition in one direction, while Fig. 5 indicates an off-target condition in the other direction.

*c.* If a result such as shown in Fig. 4 or 5 is obtained, then the antenna is rotated until the ratio of the height of echo pip 23' with respect to the height of its adjacent injected signal pip 123' is equal to the ratio of heights of pips 23" and 123". To facilitate observation, attenuator 80 can be adjusted, if necessary, to vary the level of the injected pulse and make said ratios equal to unity, as shown in Fig. 6 or 7, depending upon which lobe is being more overloaded than the other. It will be seen that, in Figs. 6 and 7, neither the echo pips nor injected signal pips are equal, but that each echo pip is equal to its adjacent injected signal pip. However, this indicates that, despite the inequality of the two echo pips, the echo energy levels in the two antenna lobes are equal, since equal injected signals from oscillator 88 are also unequally amplified in the same ratio. Hence a true bearing of the target is being obtained.

Although I have described my invention as applied to a pulse-echo system, it is equally applicable to direction-finding systems, or any other system involving the comparison of the outputs of a plurality of signal channels. In addition, it need not be restricted for use in overcoming any inequalities due to jamming or saturation of the signal channels. It is also useful where any inequalities exist in a plurality of channels which, in accordance with prior practice, must translate signals equally.

For example, as above mentioned, lobe-switch 58 comprises two amplifiers, whereby the system comprises essentially two channels which, in this case, have a portion in common, and means for comparing the outputs of said channels. In accordance with prior practice, it was necessary to carefully match both channels so that they would equally translate the signal. By use of the present invention, these amplifiers need not be matched if the sampling signal is injected at points ahead of said channels, e. g., directly into the antenna 50. Thus, even if the amplifiers are not matched, the comparison of the echo pips with the sampling-signal pips on the oscilloscope would enable proper tracking.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

I claim:

1. In the determination of the bearing of an object by means of a pulse-echo wave-energy apparatus comprising a rotatable wave-detecting array having a pair of partially-overlapping, divergent response-lobes, wherein the bearing is determined by alternately impressing the echo-pulse energy in said lobes upon the input of an amplifier, and separately indicating the amplitudes of the echo-energy detected along the respective lobes in the amplifier output; the method of tracking which comprises impressing a sampling pulse upon the input of said amplifier at a time which is slightly displaced from the reception of each echo, separately indicating the amplitudes of the sampling pulses in the amplifier output which accompany the echoes detected along the respective lobes, and rotating said array until the indicated amplitudes of said echoes and sampling pulses reach a desired relation.

2. In the determination of the bearing of an object by means of a pulse-echo wave-energy apparatus comprising a rotatable wave-responsive array having a pair of equal, partially-overlapping, divergent response-lobes, wherein the bearing is determined by alternately impressing the echo-pulse energy in said lobes upon the input of a receiver and separately indicating the amplitudes of the echo-energy detected along the respective lobes in the receiver output, and wherein jamming on at least one of said lobes affects the amplification of at least one stage of said receiver; the method of tracking in the presence of said jamming which comprises injecting a sampling pulse at a point prior to said stage at a time which is slightly displaced from the reception of each echo, separately indicating the amplitudes of the sampling pulses in the receiver output which accompany the echoes detected along the respective lobes, and rotating said array until the ratios of the amplitudes of the echoes received along respective lobes with respect to the amplitudes of the accompanying injected pulses are equal.

3. In the determination of the bearing of an object by means of a pulse-echo wave-energy apparatus comprising a rotatable wave-responsive array having a pair of equal, partially-overlapping response lobes and a pulse-amplitude indicator, wherein said tracking is accomplished by alternately impressing the echo-pulse energy in said lobes upon the input of a receiver, and simultaneously and separately displaying on said indicator the amplitude of echoes received on the respective lobes, and wherein jamming on at least one of said lobes affects the amplification of at least one stage of said receiver; the method of tracking in the presence of said jamming which comprises injecting a uniform sampling pulse at a point prior to said stage and at a time which is slightly displaced from the reception of each echo, displaying on said indicator the amplitude of said sampling pulse on said screen adjacent to the display of the amplitude of the echo being currently received, and rotating said array until the ratios of the amplitudes of the respective echo-displays with respect to the amplitudes of their adjacent sampling-pulse displays are equal.

4. In the determination of the bearing of an object by means of a radio pulse-echo apparatus comprising an oscilloscope and a rotatable antenna array having a pair of equal, partially-overlapping, divergent response lobes, wherein said tracking is accomplished by alternately impressing the echo-pulse energy in said lobes upon the input of a receiver and simultaneously and separately displaying on the oscilloscope screen the echoes received on the respective lobes, and wherein jamming on at least one of said lobes overloads at least one stage of said receiver; the method of tracking in the presence of said jamming which comprises rotating said antenna array until the two echo displays are of equal height, injecting a uniform sampling pulse at a point prior to said stage and at a time which is slightly displaced from the reception of each echo, the carrier frequency of said sampling pulse being the same as that of the received echo at said point, displaying each sampling pulse on said screen adjacent to the display of the echo being currently received, and again rotating said antenna array until the ratios of the amplitudes of the respective echo-displays with respect to the amplitudes of their accompanying sampling-pulse displays are equal.

5. A pulse-echo system for detecting objects comprising a directional antenna having divergent, partially-overlapping response lobes; a receiver; switching means for alternately connecting said antenna lobes to the input of said receiver; a cathode ray indicator having vertical and horizontal deflecting means; a sweep circuit connected to one of said deflecting means to provide a time base for said indicator, a circuit for connecting the signal output of said receiver to the other of said deflecting means to deflect a relatively small portion of said time base; means generating a square wave for operating said switching means and, in synchronism therewith, for controlling one of said deflecting means to produce a separation of the indications of the energy in the respective lobes, and means for injecting into the input of one of the receiver circuits a carrier-wave pulse slightly displaced in time from the reception of each echo pulse.

6. A double-tracking pulse-echo system comprising an antenna having a pair of diverging lobes; a receiver; means for alternately switching the signal output of said lobes to the input of said receiver; a cathode ray oscilloscope having a pair of deflecting means and a fluorescent screen; a sweep circuit connected to one of said deflecting means for producing a linear time base on said screen; means feeding the output of said receiver to the other of said deflecting means for producing visual indications of said signals on said time base, means for linearly shifting said time base in synchronism with said alternate switching to produce laterally-displaced indications of the signal output of the respective lobes; and means for injecting a uniform carrier-wave pulse into the receiver input at a time which is displaced from the reception of each pulse.

7. In the determination of the bearing of a signal wave, characterized by recurring pulses, by means of a receiver including a rotatable wave-detecting array having at least a pair of divergent response lobes, and wherein said bearing is determined by separately indicating the outputs of said lobes, and comparing the relative amplitudes of said outputs; the method of determining the bearing of said signal which comprises the steps of radiating uniform sampling pulses so as to be received equally by both lobes at times slightly displaced from the reception of said signal pulses, separately indicating the amplitudes of said sampling pulses after being received by said lobes and rotating said wave-detecting array until the ratio of the amplitudes of the respective signal pulses with respect to the amplitudes of the accompanying sampling pulses are equal.

8. In the determination of the bearing of a signal wave, characterized by recurring pulses, by means of a receiver including a rotatable wave-detecting array having at least a pair of divergent response lobes and at least a pair of channels for separately translating the energy in each lobe, and wherein said bearing is determined by separately indicating the outputs of said channels on the screen of said oscilloscope and comparing the relative amplitudes of said outputs; the method of determining the bearing of said signal which comprises the steps of injecting uniform sampling pulses equally into both channels at points preceding said channels and at times slightly displaced from the reception of said signal pulses, separately indicating the amplitudes of said sampling pulses after being translated by said channels, rotating said wave-detecting array until the ratio of the amplitudes of the respective signal pulses with respect to the amplitudes of the accompanying sampling pulses are equal.

9. In the determination of the bearing of a signal wave, characterized by regularly-recurring pulses, by means of a receiver including an oscilloscope and a rotatable antenna array having at least a pair of divergent response lobes and at least a pair of channels for separately translating the energy in each lobe, and wherein said bearing is determined by separately indicating the outputs of said channels on the screen of said oscilloscope and comparing the relative amplitudes of said outputs, the method of determining the bearing of said signal which comprises the steps of rotating said array until said outputs are equal, injecting uniform sampling pulses equally into both channels at points preceding said channels and at times slightly displaced from the reception of said signal pulses, displaying said sampling pulses on said screen adjacent to said signal pulses, and again rotating said antenna array until the ratio of the amplitudes of the respective signal-pulse displays with respect to the amplitudes of the accompanying sampling-pulse displays are equal.

EDWIN K. STODOLA.

REFERENCES CITED

The following references are of record in the file of this patent:

UNITED STATES PATENTS

| Number | Name | Date |
|---|---|---|
| 2,255,659 | Gage | Sept. 9, 1941 |
| 2,312,203 | Wallace | Feb. 23, 1943 |